United States Patent [19]

Bundschuh

[11] 3,750,921
[45] Aug. 7, 1973

[54] TWO FRAMES PER SECOND DEFEAT MECHANISM

[76] Inventor: John J. Bundschuh, 901 Elmgrove Rd., Rochester, N.Y.

[22] Filed: May 4, 1972

[21] Appl. No.: 250,263

[52] U.S. Cl.................... 226/62, 226/122, 226/160, 226/161, 352/194
[51] Int. Cl. ............................................ G03b 1/22
[58] Field of Search .................. 226/62, 64, 65, 66, 226/122, 160, 161; 352/194, 72, 195, 196, 169, 180

[56] References Cited
UNITED STATES PATENTS

| | | | |
|---|---|---|---|
| 3,524,573 | 8/1970 | Kotler et al............................ | 226/62 |
| 3,261,654 | 7/1966 | Faber et al.......................... | 352/194 |

*Primary Examiner*—Richard A. Schacher
*Assistant Examiner*—Gene A. Church
*Attorney*—W. H. J. Kline et al.

[57] ABSTRACT

An improved intermittent film transport mechanism for a motion picture projector includes a film claw which is caused to engage and advance the film in the projector at a periodic rate and also includes a member for intermittently intercepting the claw so as to achieve advancement of the film at a fraction of such periodic rate. The member is caused to move in a synchronous relation with the claw by a cam which is selectively operated by the engagement or disengagement of a pawl and ratchet mechanism.

5 Claims, 8 Drawing Figures

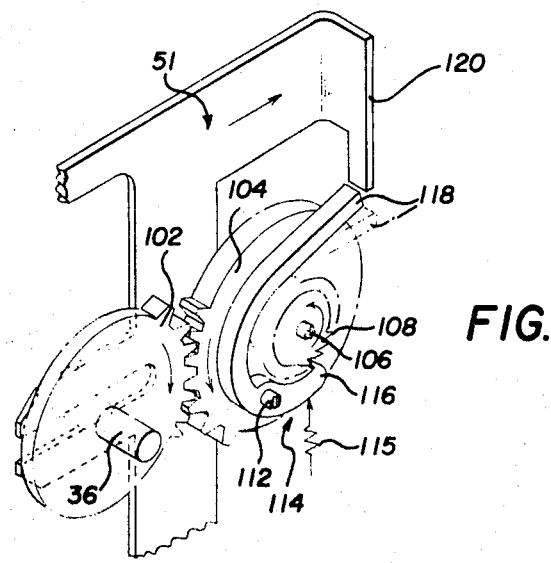
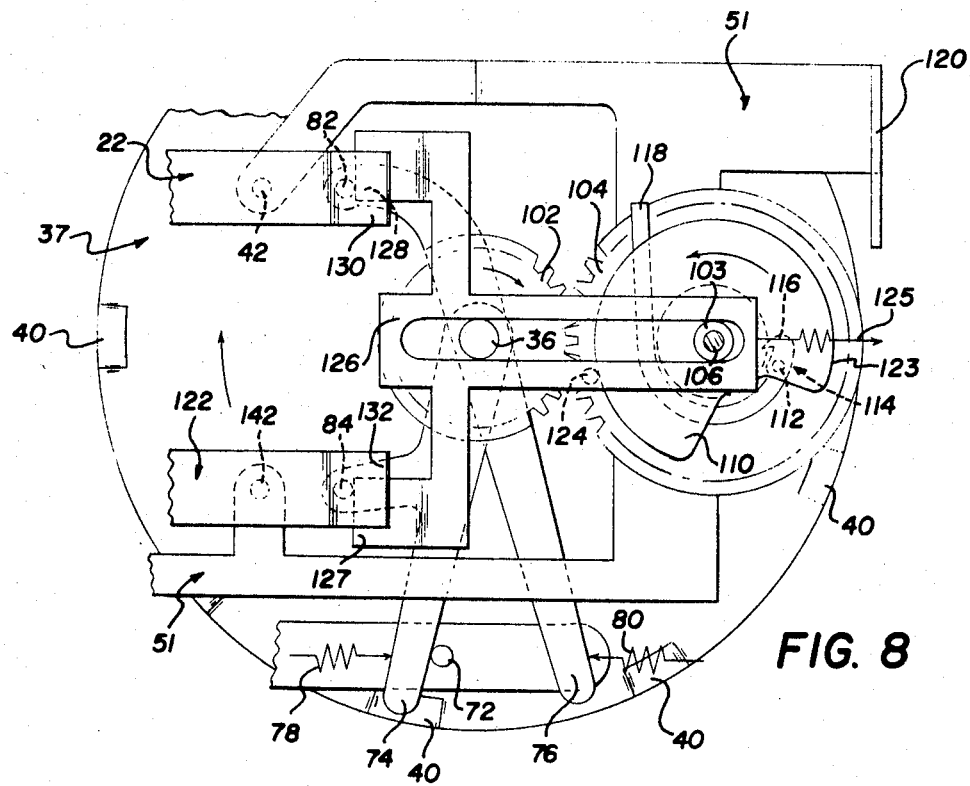

TWO FRAMES PER SECOND DEFEAT MECHANISM

BACKGROUND OF THE INVENTION

1. Field of the Invention

This invention relates generally to web handling apparatus, such as motion picture projectors which have a film claw driven to engage and advance a film strip, and more particularly to a defeat mechanism for controlling the film claw in such a motion picture projector so as to hold the claw disengaged from the film at a time in the operating cycle when it otherwise would be engaged with the film.

2. Description of the Prior Art

It is known in the motion picture art to advance perforated film through a projection gate of a motion picture projector by having a cam mechanism adapted to drive a film claw "up-and-down" parallel to the film advancing direction and "in-and-out" perpendicular to the film advancing direction. The "up-and-down" movement of the claw effects movement of the film through the gate, while the "in-and-out" movement of the claw causes the film engaging portion of the claw to enter or retract from the perforations in the film during the advance and return strokes of the claw respectively.

Many types of cam mechanisms are known for effecting the desired movement of the film claw in a motion picture projector. One typical mechanism used for variable speed projectors is disclosed in commonly assigned U.S. Pat. No. 3,261,654 entitled, "FILM FEEDING MECHANISM" issued in the name of R. L. Faber et al. on July 19, 1966, and in commonly assigned U.S. Pat. No. 3,402,006 entitled, "MOTION PICTURE PROJECTOR" issued to J. J. Bundschuh et al. on Sept. 17, 1968. In such mechanisms, an eccentric or radial cam cooperates with the film claw for controlling movement of the claw in a film feeding direction, and an axial or face cam is provided for causing movement of the claw in the film engaging direction. As disclosed in the Faber et al patent, a cam follower cooperates with a plurality of indentations on the face cam to cause the spring-biased film claw to engage the film. While such a mechanism works satisfactorily, it can be appreciated that the minimum number of in-and-out movements of the film claw is limited to the number of indentations which are contacted by the cam follower. And, where the face cam is driven at six revolutions per second (as disclosed in the Faber et al. patent), a single indentation on the face cam causes the film to be advanced six frames per second. In some instances, however, slower projection speeds are desired.

To provide for slower projection speeds in projectors using intermittent feed mechanisms, it is known in the prior art to use what is commonly termed a "defeat mechanism" for preventing the film claw from engaging the in-and-out cam of the motion picture projector during a portion of the normal rotation of the in-and-out cam. Typical of such defeat mechanisms are those disclosed in the early Swiss Pat. No. 257,425 issued Apr. 1, 1949 to Pathe-Cinema and in the more-recent U.S. Pat. No. 3,524,573 entitled, "INTERMITTENT FILM TRANSPORT MEANS FOR MOTION PICTURE PROJECTOR" issued on Aug. 18, 1970 to M. Kotler et al. As disclosed in those patents, a member is provided for periodic interception of the film claw as it is biased toward the film, thereby intermittently preventing engagement of the film claw with the film. While such mechanisms are effective to provide desired slower projection speeds, they typically require a separate speed control linkage which results in the projector being more expensive to manufacture and more complicated to operate. The present invention is an improvement over these previous defeat mechanisms for it is adapted for use with a single speed control linkage.

SUMMARY OF THE INVENTION

It is an object of this invention to provide an improved motion picture projector adapted for very slow projection speeds.

It is another object of the present invention to provide an improved film claw control mechanism for a motion picture projector, including means for intermittently preventing the film claw from cooperating with the in-and-out face cam so as to provide slower projection speeds.

It is further object of the present invention to provide a motion picture projector, including a defeat mechanism for periodically restraining the film claw from engaging the film so as to provide a projection speed corresponding to less than one advancement of the film per revolution of the in-and-out cam.

Still another object of the present invention is to provide an improved motion picture projector for advancing a perforated film at a rate of two frames per second.

According to a preferred embodiment of the invention, an improved film transport mechanism for a motion picture projector includes a defeat mechanism periodically restraining the film claw from being driven into contact with the film strip by the in-and-out cam. The defeat mechanism is effective to prevent the film claw from contacting the cam until the cam has rotated more than one complete revolution, whereby the film may be advanced at a rate corresponding to less than one frame per revolution of the in-and-out cam.

The invention, and its objects and advantages, will become more apparent from the detailed description of the preferred embodiment of the invention presented below.

BRIEF DESCRIPTION OF THE DRAWINGS

In the detailed description of the preferred embodiments of the invention presented below, reference is made to the accompanying drawings in which:

FIG. 7 is an enlarged, fragmentary view in perspective showing a portion of the mechanism shown in FIG. 5 when the defeat mechanism is engaged;

FIG. 8 is an enlarged, front elevational view of a portion of the defeat mechanism shown in FIGS. 5–7.

DESCRIPTION OF THE PREFERRED EMBODIMENT

Because projectors are well known, the present description will be directed in particular to elements forming part of, or cooperating more directly with, apparatus in accordance with the present invention. It is to be understood that projector elements not specifically shown or described may take various forms well known to those skilled in the art.

For purposes of clarity and simplification the drawings show those parts of a motion picture projector which facilitate an understanding of the present invention. The embodiment of the invention shown in FIGS. 1–4 is especially suitable for use with the projector of the type depicted and described fully in the aforementioned commonly assigned Faber et al. U.S. Pat. No. 3,261,654. Similarly, the embodiment shown in FIGS. 5–8 is especially suited for the type of projector disclosed in aforementioned commonly assigned Bundschuh U.S. Pat. No. 3,402,006. Accordingly, the disclosures in those patents are incorporated herein by reference.

Figure 1:
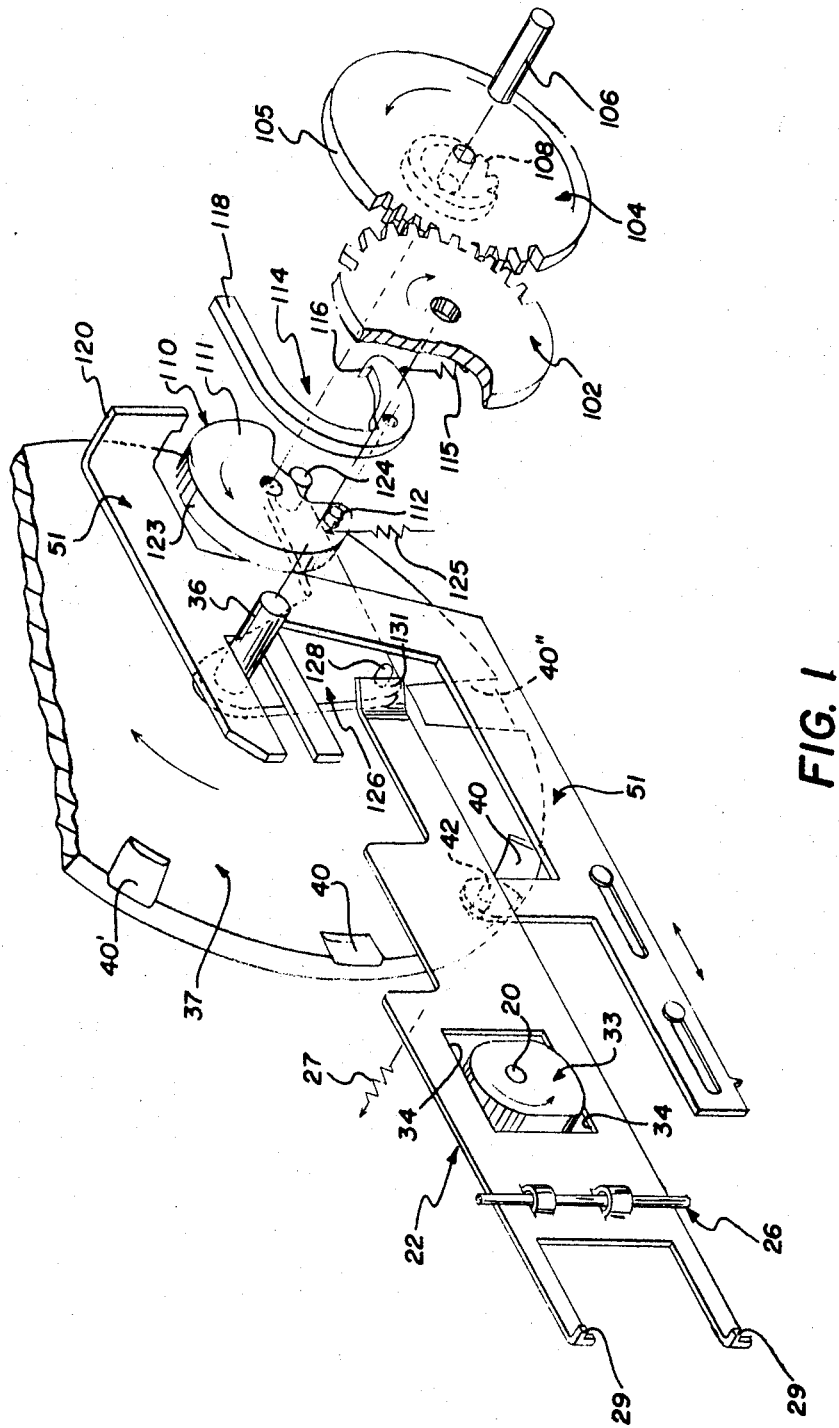
FIG. 1 is a partially exploded, perspective view of an intermittent pull-down mechanism for a motion picture projector constructed in accordance with a preferred embodiment of the present invention.
Figure 2:
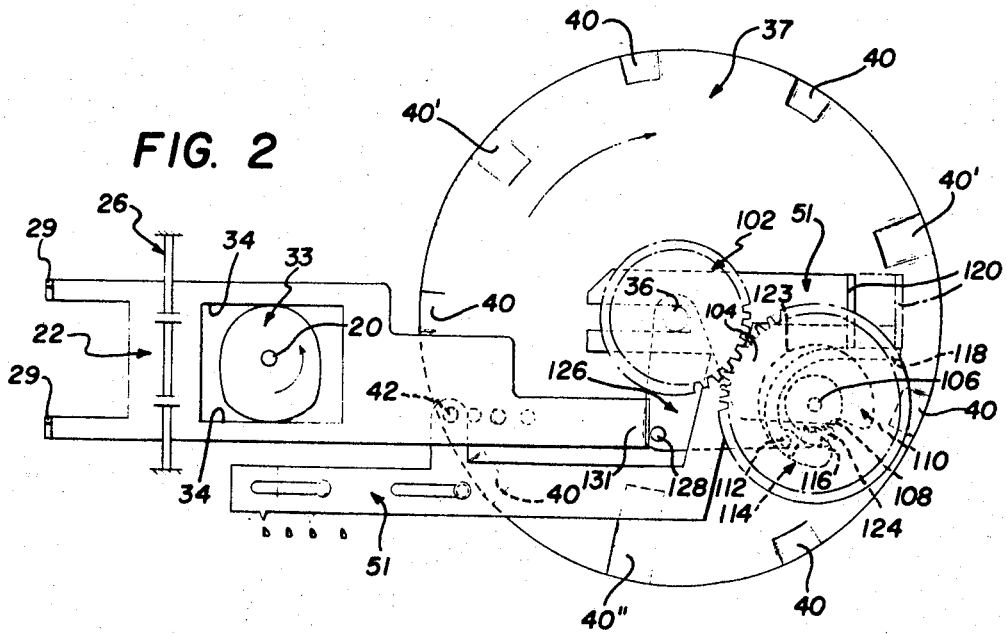
FIG. 2 is a front elevational view of the mechanism shown in FIG. 1 with a defeat mechanism in an inoperative position for allowing the intermittent pull-down mechanism to be operated through a normal range of projection speeds.

Referring now to the drawings, FIGS. 1–4 show an embodiment of the present invention for a projector having a single film claw arm adapted to advance a film strip through a projector. As best seen in FIG. 1, the intermittent film feeding mechanism of the projector includes a rigid claw arm 22 having a plurality of claw teeth 29 for engaging and advancing a film strip (not shown). Claw arm 22 is mounted to move up and down and also to pivot relative to a film gate by use of any suitable pivot arrangement, as for example, a simple pivot arrangement as shown in FIG. 1 and identified by the numeral 26, or a more complex ball and runner arrangement shown in FIG. 5 and identified by the numeral 26a. This latter arrangement is described in detail in the Bundschuh patent.

The claw arm 22 is urged in a counterclockwise direction about the pivot axis 26 toward the film strip by a spring 27, which has one end secured to the claw arm and the other end secured to the projector in a known manner (not shown). Spring 27 also acts to urge claw arm 22 into contact with a ball 42 which serves as a cam follower for engaging an in-and-out cam 37. As will be described later in greater detail, ball 42 causes claw arm 22 to pivot about pivot axis 26 resulting in movement of claw teeth 29 into and out of the film engaging position.

While the claw arm 22 is caused to move in this manner, the claw also can be moved up and down to effect the film advance. The up-and-down movement of the claw arm 22 for advancing the film is under the control of an up-and-down or pull-down cam 33. Cam 33 is secured to a drive shaft 20 and is embraced by a pair of follower surfaces 34 on claw arm 22 such that each revolution of the up-and-down cam 33 is effective to produce one complete reciprocal stroke of the film claw 22. Thus, as described in the Faber et al patent, where shaft 20 is typically driven at 54 revolutions per second, claw 22 is caused to reciprocate in the up-and-down direction at a rate of 54 strokes per second.

The normal in-and-out movement of the pull-down claw 22 relative to the film gate is produced by a mechanism which is well known but will now be briefly described. Shaft 36 is rotatably mounted in the projector, in substantially parallel relation with the drive shaft 20. A radial or face cam 37 is secured to the shaft 36 and is driven in synchronism with drive shaft 20 by known means, such as a gear drive. The face of cam 37 is provided with a plurality of depressions or indentations such as 40, 40' and 40", which have various radial dimensions and are spaced circumferentially about the face of cam 37 as disclosed in the Faber et al patent. These indentations and follower 42 are effective to cause claw arm 22 to move in-and-out relative to the cam 37 at various frequencies. For example, when cam 37 is rotated at six revolutions per second, the number of indentations can be selected to effect pull-down of film at 6, 18 and 54 frames per second.

In operation, the cam follower 42 is positioned radially of the face cam 37 by movement of slide member 51 that carries the follower such that the cam follower 42 is in alignment with different ones of the depressions 40, 40' and 40". Then, as face cam 37 is rotated, cam follower 42 is caused to move into and out of the depressions and the claw arm 22, which is held into contact with cam follower 42 by the spring 27, is urged by spring 27 to follow the inward movements of cam follower 42. Consequently, as the cam follower 42 moves into a depression, claw arm 22 pivots about post 26 moving the claw teeth 29 into the film engaging position. As the follower moves out of the recess and back onto the face of the cam 37, the force of spring 27 is overcome and the claw arm 22 is pivoted about pivot axis 26 moving the teeth 29 out of the film engaging position. This in-and-out motion of the claw arm 22 allows the film to be advanced as the claw is also being moved up-and-down in synchronous relation by cam 33.

As previously mentioned and now may be better understood from the discussion of the operation of the mechanism, the minimum projection speed permitted by this basic mechanism occurs when cam follower 42 is positioned to contact a single depression 40" on the rotating face of cam 37. Thus, where cam 37 is driven at a speed of six revolutions per second, the film claw 22 engages the film six times per second resulting in the claw 22 advancing the film at a rate of six frames per second. As previously mentioned, this rate is not sufficiently slow for certain applications. Thus, the need for the present invention which is adapted to cause advancement of the film at a rate less than the minimum obtainable by cam 37 alone (e.g., six frames per second) by the use of a mechanism which will now be explained in greater detail.

A shaft 106 extends substantially parallel to shaft 36 and is rotatably secured to the projector by any known means, such as journal bearings. A pinion 102 is secured to the drive shaft 36 and positioned for driving a gear 104 which is secured to a shaft 106. Since pinion 102 has one-third as many teeth as gear 104, gear 104 and shaft 106 are necessarily driven by pinion 102 at one-third the speed of drive shaft 36.

As best shown in FIG. 1, a ratchet member 108 is secured to shaft 106 closely adjacent to gear 104 and could be integral therewith. A cam 110 is mounted for rotation about shaft 106 and in a position adjacent to ratchet member 108. Although cam 110 is free to rotate about shaft 106, it is restrained from translational movement along shaft 106 by its placement between cam member 110 and slide member 51. Friction reducing members, such as washers (not shown) can be inserted on shaft 106 between the cam 110 and the surfaces of ratchet 108 and/or slide 51 to reduce any undesired friction between the members.

A pivot shaft 112 is eccentrically secured to the surface 111 of cam 110 and extends along an axis parallel to shaft 106 over the outer surface of the ratchet member 108. A pawl 114 is pivotally mounted on shaft 112 between surface 111 of cam 110 and the inner radial surface 105 of gear 104. When mounted in that position, the first end portion 116 of pawl 114 is positionable for engaging ratchet member 108 and the second end portion 118 is positionable for contacting a bent-off tab portion 120 of slide member 51.

Figure 3:
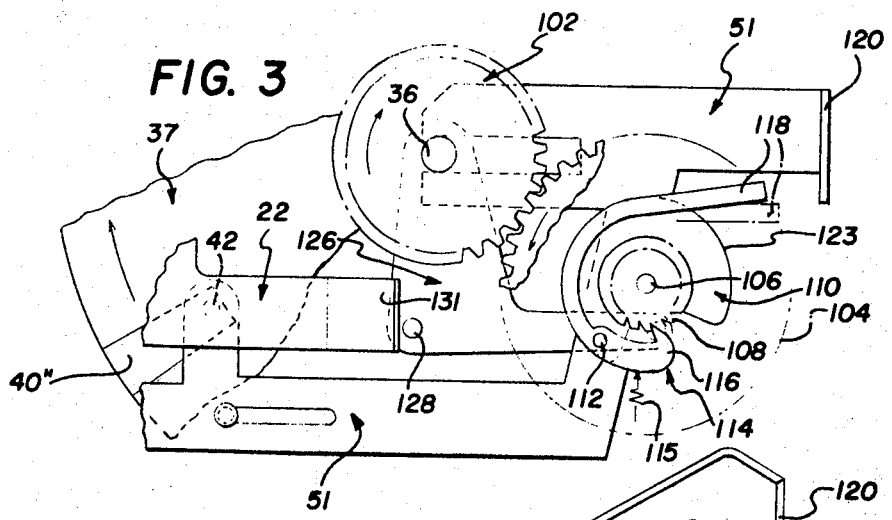
FIG. 3 is an enlarged, front elevational view of a portion of the defeat mechanism as shown in FIG. 2, showing in detail the parts of the mechanism when engaged in operating position.

As indicated in FIG. 1, pawl 114 is urged to pivot in a counterclockwise direction around shaft 112 by a spring 115, such that end portion 118 of the pawl 114 is urged to contact tab 120, when slide 51 is positioned for operation at speeds of 6, 18 or 54 frames per second. However, when slide member 51 is moved to the extreme right for two frames per second operation, as shown in FIG. 3, end portion 118 no longer can contact tab 120 and spring 115 then urges pawl 114 to pivot about shaft 112 until the end 116 of pawl 114 is operatively engaged with ratchet 108. When pawl 114 is thus engaged with ratchet 108, the pawl and thus cam 110 is effectively coupled to gear 104 and shaft 106, and the cam 110 is caused to rotate as if it were itself secured to shaft 106. That is, the rotational force applied to ratchet 108 is transmitted by pawl 114 to shaft 112 which in turn causes cam 110 to be driven by shaft 106 as if those members were a single unit. Spring 115 is effective to maintain the engagement of pawl 114 with ratchet 108 until slide member 51 is again moved to the left, as shown in FIG. 1, whereupon the tab 120 again contacts end portion 118 and causes pawl 114 to be disengaged as the shaft 106 continues to rotate.

A plate 126 is pivotally mounted about shaft 106 closely adjacent to face cam 37 and extends behind slide member 51 in slidable contact therewith. Extending from plate 126 is a shaft 124 which is positioned to engage and follow the edge surface 123 of cam 110. A spring 125 urges plate 126 in a counterclockwise direction about shaft 106 and resiliently urges shaft 124 into continued contact with cam surface 123. Thus, as cam 110 is caused to rotate, shaft 124 is caused to follow the rotating surface 123 resulting in pivoting of plate 126 about shaft 106 in a manner determined by the contour of cam surface 123.

Figure 4:
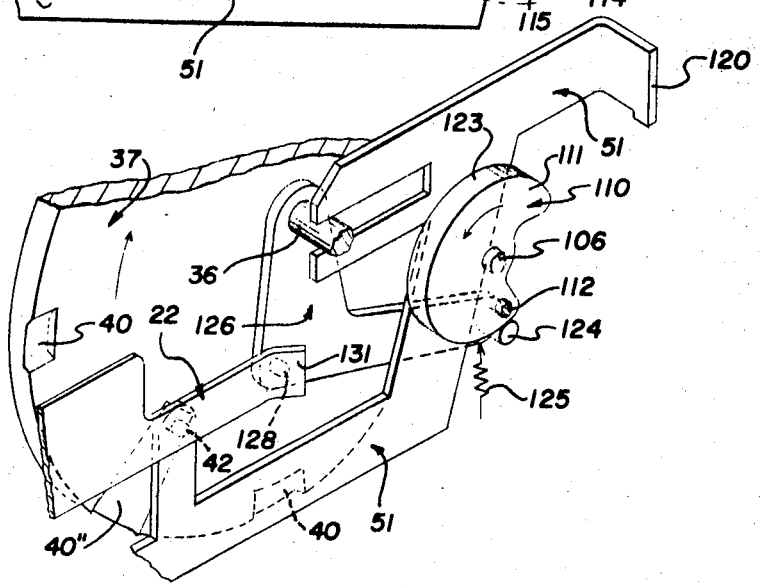
FIG. 4 is an enlarged, fragmentary view in perspective showing the portion of a preferred embodiment of the present invention illustrated in FIG. 3 with a portion of the defeat mechanism broken away to show in greater detail the manner in which the film claw is prevented from cooperating with the in-and-out cam follower.

Also as seen in FIG. 4, a stud shaft 128 extends from plate 126 and is positioned to contact a bent tab portion 130 of film claw 22. A clockwise rotation of plate 126 causes post 128 to engage the tab 131 which drive film claw 22 in a clockwise direction about its pivoting axis 26, contrary to the force applied by spring 27. Thus, when post 128 is forced into contact with tab 130 it causes the movement of film claw 22 away from cam surface 37 and prevents the claw 22 from following the movement of in-and-out cam follower 42. The result of this contact of post 128 with tab 131 of the claw 22 is to restrain the claw teeth 29 from moving into the film engaging position while the claw continues to reciprocate up and down as it is driven by cam 33.

To better understand the invention as shown in FIGS. 1-4, the operation of the mechanism will now be briefly summarized. As shown in FIG. 3, when the slide 51 is positioned to the right for two frames per second operation, pawl 114 becomes operatively engaged with ratchet 108 causing cam 110 to rotate at one-third the speed of shaft 36 or two revolutions per second. When cam 110 rotates, surface 123 cooperates with shaft 124 on plate 126 to overcome the force of spring 125 and, as shown in FIG. 4, this results in the plate 126 being driven in a clockwise direction about shaft 36. Stud shaft 128 is then driven into contact with the tab 131 of film claw 22 and is effective in this position to hold film claw 22 in such a restrained position for approximately 240° of rotation of cam 110. As the cam 110 continues to rotate, shaft 124 continues to follow along the contour of cam surface 123 and into an indented portion thereof, as seen in FIG. 3, allowing spring 125 to again move the plate 126 in a counterclockwise direction and allowing stud shaft 128 to be removed from contact with tab 131 for approximately 80° of rotation of cam 110. The effect of movement of stud shaft 128 into and out of contact with the tab 131 once per revolution of cam 110 is to allow the film claw 22 to follow the movement of the in-and-out cam follower 42 only once for every third revolution of the in-and-out cam 37. That is, for every six revolutions of in-and-out face cam 37, cam 110 rotates twice and allows the film claw 22 to be urged by cam follower 42 into engagement with the film only twice. Thus, the mechanism is effective to provide advancement of the film at a rate of two frames per second.

Referring now primarily to FIGS. 5-8, the embodiment of the invention shown therein is especially suited for use with a projector which provides more than one film claw to be selectively operated with more than one film format having different perforation pitches and sizes as, for example, the formats commonly referred to as "super 8" and "regular 8". Such a projector is more fully described in the aforementioned Bundschuh U.S. Pat. No. 3,402,006. Although the particular embodiment shown is adapted for either regular 8 or super 8 movie film, such mechanism is also suitable for use with other film types. The mechanism shown in FIGS. 5-8 is basically similar in function to that shown by FIGS. 1-4. Thus, to simplify the discussion and to aid to understanding of this embodiment, parts in FIGS. 5-8 which are similar in structure and function to the parts shown in FIGS. 1-4 are referred to by the same numeral even though the particular embodiment may necessitate a slightly different structure of the part.

Figure 5:
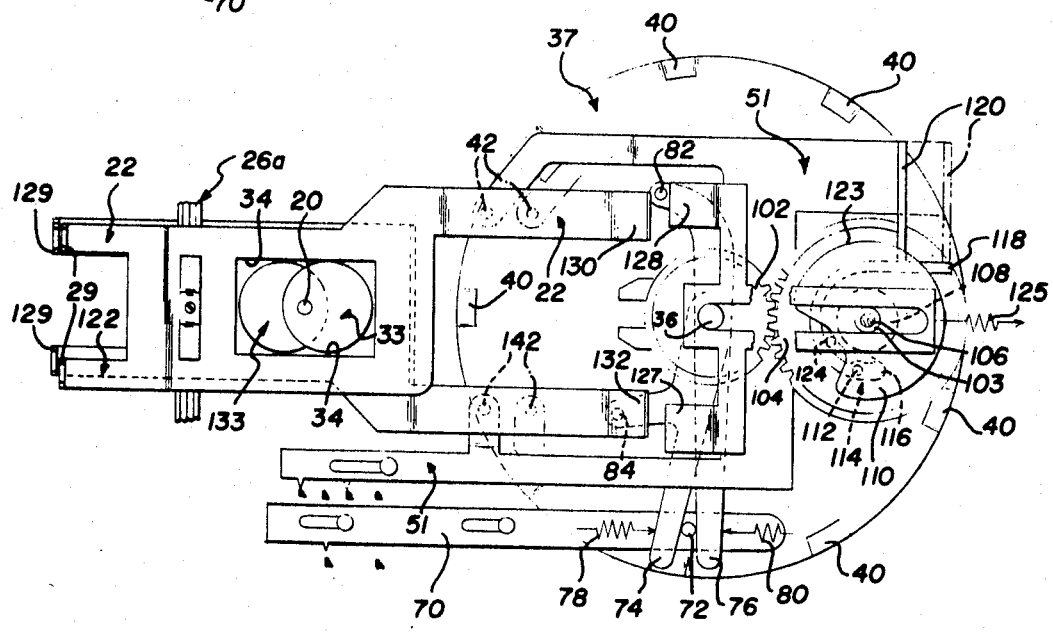
FIG. 5 is a front elevational view of another embodiment of the present invention wherein provision is made for projection of both regular 8 and super 8 films.

As shown in FIG. 5, the projector mechanism includes claw arms 22 and 122, each having pairs of claw teeth 29 and 129, respectively, for engaging different film types. Claw arms 22 and 122 are driven in the up-and-down direction in the usual manner by an up-and-down cam 33 and 133 respectively. The in-and-out motion of film claws 22 and 122 are controlled by in-and-out cam followers 42 and 142 respectively which cooperate with in-and-out cam 37 in a manner previously discussed. That is, cam followers 42 and 142 are movable radially of face cam 37 into alignment with different ones of said concentric, and circular cam surfaces 40, 40' and 40" to provide multiple predetermined projection speeds.

The mechanism for controlling the operation of each claw arm is more fully disclosed in the aforementioned Bundschuh patent but will now be briefly described here to aid in understanding this particular embodiment of the present invention. The control mechanism includes film selector lever 70 which is slidably mounted on the projector housing in any suitable manner (not shown). Secured to lever 70 is a shaft 72 which is effective for moving and restraining either control arm 74 or control arm 76 both of which are pivotably mounted about shaft 36 and are resiliently urged into contact with the shaft 72 by springs 78 and 80 respectively.

Figure 6:
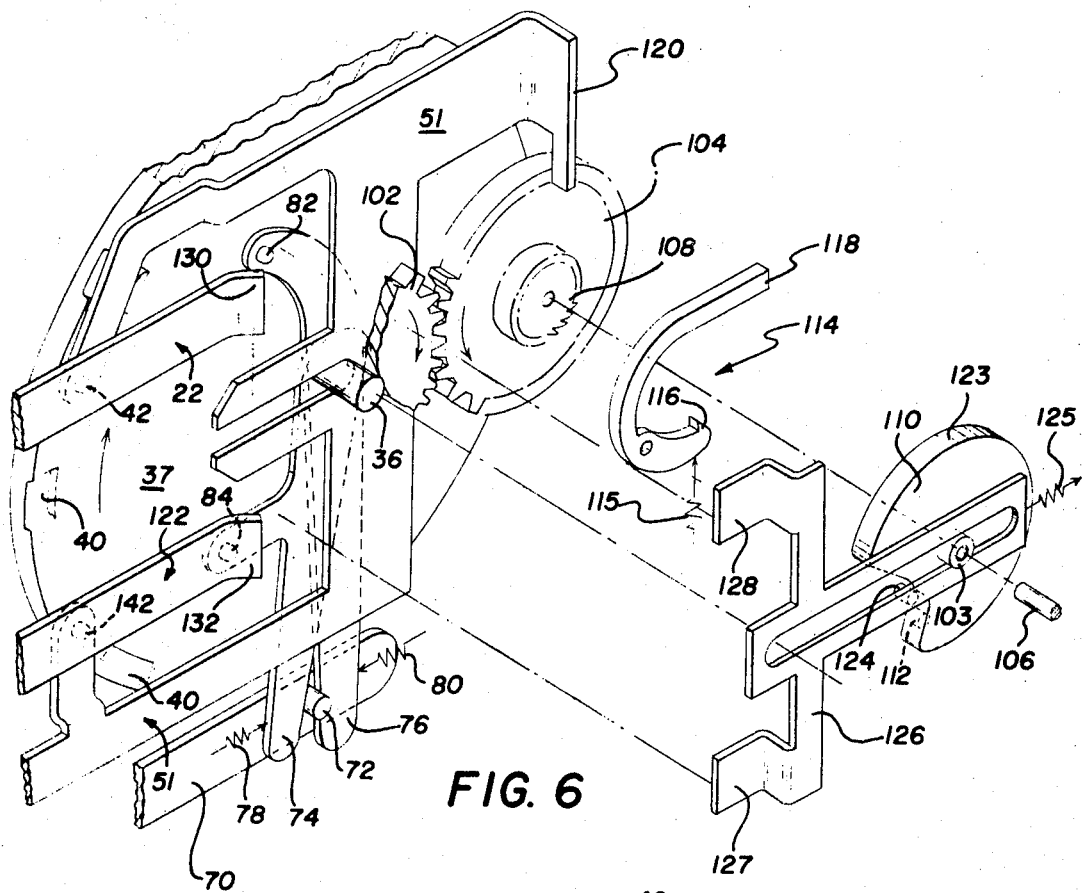
FIG. 6 is a partially exploded perspective view of the intermittent pull-down mechanism shown in FIG. 5.

As may be seen in FIG. 6, a stud shaft 82 extends from control arm 76 and is engageable with a bent tab portion 130 of film claw 22. When stud shaft 82 is held into contact with the tab 130, it is effective to cause the claw to be rotated in a clockwise direction about the pivot means 26a and thereby cause the film claw 22 to be inoperative to engage a film strip. Similarly, a stud shaft 84 extends from control arm 74 for contacting tab 132 of film claw 122 and for preventing the claw arm 122 from advancing a film strip.

In operation of the projector mechanism shown in FIGS. 5-8, slide 70 is positioned for use with either regular 8 or super 8 movie film. If slide 70 is positioned for regular 8 operation, as shown in FIG. 5, control arm 74 is pivoted in a clockwise direction about shaft 36 and the stud shaft 84 on arm 74 is in forced into contact with tab 132 thereby causing claw arm 122 to be held inoperative while allowing film claw 22 to operate for engaging and advancing film. However, if slide 70 is then moved to the right to the indicated super 8 position, shaft 72 would cause control arm 76 to be pivoted in a counterclockwise direction about shaft 36 causing stud shaft 82 to engage tab 130 and resulting in claw 22 becoming ineffective to follow in-and-out cam follower 42, thus preventing claw 22 from engaging the film. Also, such movement of the slide 70 would allow spring 78 to urge control arm 74 to rotate in a counterclockwise direction about shaft 36, removing stud shaft 84 from contact with tab 132 and allowing film claw 122 to be driven in response to in-and-out cam follower 142 for engaging and advancing film.

As shown in FIGS. 5-8, the embodiment of the present invention now to be described in detail is adapted to cooperate with such a projector mechanism. As shown in FIG. 6, a pinion 102 is mounted upon shaft 36 adjacent to slide member 51. Pinion 102 drives a gear 104 which has approximately one-third as many teeth as pinion 102. Gear 104 is secured to shaft 106 substantially between slide member 51 and ratchet 108 which is also secured to shaft 106. Rotatably mounted about shaft 106 and positioned adjacent to ratchet 108 is a cam 110 which is restrained from translational movement along shaft 106 by its placement between ratchet 108 and means for supporting shaft 106 such as a journal bearing (not shown).

A pivot shaft 112 extends from surface 111 of cam 110 and extends over ratchet 108. A pawl 114 is pivotally mounted on the pivot shaft 112 between gear 104 and cam 110. Pawl 114 has an end portion 116 which is positioned near ratchet 108 and is engageable therewith. As seen in FIG. 7, pawl 114 also has an end portion 118 which is positionable for engagement with bent tab portion 120 of slide 51. Pawl 114 is urged by spring means 115 in a counterclockwise direction about shaft 112 such that when end portion 118 is not restrained by tab 120, the end portion 116 is engageable with ratchet 108.

Extending from the central portion of cam 110 is a bushing 103 and, as shown in FIG. 8, a plate 126 is mounted for translational movement between this bushing 103 and shaft 36. As best shown in FIG. 6, plate 126 has extending therefrom a shaft 124 which is urged into contact with cam surface 123 by a spring 125. Plate 126 is slidably mounted on bushing 103 and shaft 36, and the translational movement can be imparted to plate 126 by the shaft 124 following the contour of cam surface 123 of cam 110 as it is caused to rotate. Plate 126 also has extensions 127 and 128 for contacting the stud shafts 84 and 82 of control arms 74 and 76, respectively, as plate 126 is thus caused to translate. The purpose of these extensions 127, 128 will become more apparent in the following description of the operation of the projector.

In operation of a mechanism shown in FIGS. 5-8, the film slide 70 is set at a predetermined position depending upon the type of film to be used in the projector. Positioning of slide 70 results in restraining of either film claw 22 or 122 while the other claw continues to be effective to be intermittently driven to engage and advance the film. When slide member 51 is moved to the position for two frames per second operation as shown in FIG. 7, end portion 118 of pawl 114 is no longer restrained by tab 120 of slide member 51 and spring 115 then urges end portion 116 of pawl 114 into engagement with the ratchet 108. When pawl 114 is thus engaged with ratchet 108, it causes cam 110 to rotate as shaft 106 is driven by pinion 102.

As shown in FIG. 8, the rotational movement of cam 110 causes translational movement of the control plate 126 which results in extensions 127 and 128 being driven into contact with stud shafts 84 and 82 of control arms 74 and 76, respectively, as previously discussed. Movement of plate 126 to the position shown in FIG. 8 causes both film claws 122 and 22 to be rotated about axis 26 in a clockwise direction where they are both restrained from following in-and-out cam followers 42 and 142 respectively. Thus, in this manner the translational movement of plate 126 is effective to periodically prevent both of the claw arms 122 and 22 from engaging the film and thereby permitting two frame per second operation of the projection.

If the projector were operating in the two frames per second mode and it is then desired to shift the operation of the projector to any one of the faster operating speeds by movement of slide member 51 to the left, would be effective to disengage pawl 114. Such movement would cause tab 120 of slide member 51 to again contact end portion 118 of pawl 114 releasing pawl 114 from engagement with ratchet 108 and thereby causing cam 110 to be ineffective for moving plate 126 into and out of the defeat position. Thus the mechanism is disabled and allows the normal operation of the projector when the slide 51 is positioned for any of the projection speeds other than two frames per second.

The invention has been described in detail with particular reference to preferred embodiments thereof, but it will be understood that variations and modifications can be effected within the spirit and scope of the invention.

I claim:

1. An improved film transport mechanism of the type having a film claw adapted to intermittently engage and advance a film strip and having a first cam means secured to a first shaft for imparting an in-and-out movement to said claw for causing the claw to periodically engage the film strip, the improvement comprising:
   a. a second shaft;
   b. means for driving said second shaft synchronously with said first shaft;
   c. second cam means rotatably mounted on said second shaft;
   d. ratchet means secured to said second shaft;
   e. a pawl adapted to engage said ratchet means, said pawl being operatively coupled to said second cam means for driving said second cam means when said pawl is engaged with said ratchet means; and
   f. means operable by said second cam means for restraining said claw from movement in a direction for engaging said film strip.

2. The improvement as set forth in claim 1 further comprising means for moving said pawl from a first position wherein said pawl is ineffective to engage said ratchet member to a second position wherein said pawl is engageable with said ratchet means.

3. The improvement as set forth in claim 1 wherein said means for driving said second shaft synchronous with said first shaft comprises a first gear secured to said first shaft and a second gear secured to said second shaft, the gears being coupled together.

4. The improvement as set forth in claim 3 wherein said first gear has one-third as many teeth as said second gear whereby said second shaft is caused to rotate at one-third the speed of said first shaft.

5. The improvement as set forth in claim 4 wherein said second cam is operable with said restraining means for causing said claw to be restrained from engaging said film strip for approximately two-thirds of the rotation of said second cam.

* * * * *

UNITED STATES PATENT OFFICE
CERTIFICATE OF CORRECTION

Patent No. 3,750,921     Dated August 7, 1973

Inventor(s) John J. Bundschuh

It is certified that error appears in the above-identified patent and that said Letters Patent are hereby corrected as shown below:

Column 5, Line 8, change "cam member 110" to ---ratchet member 108---.

Column 5, Line 46, change "106" to ---36---.

Column 5, Line 52, change "106" to ---36---.

Column 5, Line 56, change "106" to ---36---.

Column 7, Line 52, change "one-third" to ---three times---.

Column 8, Line 53, delete "by" and insert ---,---.

Column 8, Line 53, after "left" delete ",".

Signed and sealed this 11th day of June 1974.

(SEAL)
Attest:

EDWARD M. FLETCHER, JR.
Attesting Officer

C. MARSHALL DANN
Commissioner of Patent